US011246169B2

(12) United States Patent
Xiang et al.

(10) Patent No.: US 11,246,169 B2
(45) Date of Patent: Feb. 8, 2022

(54) COMMUNICATION METHOD, RELATED DEVICE, AND SYSTEM

(71) Applicant: Huawei Technologies Co., Ltd., Guangdong (CN)

(72) Inventors: Zhengzheng Xiang, Shanghai (CN); Jiyong Pang, Shanghai (CN); Hongjia Su, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 93 days.

(21) Appl. No.: 16/750,949

(22) Filed: Jan. 23, 2020

(65) Prior Publication Data
US 2020/0170047 A1 May 28, 2020

Related U.S. Application Data

(63) Continuation of application No. PCT/CN2018/093355, filed on Jun. 28, 2018.

(30) Foreign Application Priority Data

Jul. 28, 2017 (CN) .......................... 201710637567.3

(51) Int. Cl.
H04W 74/08 (2009.01)
H04L 5/00 (2006.01)
H04W 74/00 (2009.01)

(52) U.S. Cl.
CPC ....... *H04W 74/0833* (2013.01); *H04L 5/0048* (2013.01); *H04L 5/0053* (2013.01); *H04W 74/006* (2013.01); *H04W 74/0866* (2013.01)

(58) Field of Classification Search
None
See application file for complete search history.

(56) References Cited

U.S. PATENT DOCUMENTS

2013/0039314 A1* 2/2013 Prateek ................. H04W 74/08 370/329
2015/0334756 A1* 11/2015 Lu ......................... H04W 76/14 370/329

(Continued)

FOREIGN PATENT DOCUMENTS

CN 103024924 A 4/2013
CN 103108405 A 5/2013

(Continued)

OTHER PUBLICATIONS

Huawei, HiSilicon, Support for UE Cooperation in NR. 3GPP TSG RAN WG1 Meeting #85, Nanjing, China, May 23-27, 2016, R1-164379, 7 pages.

*Primary Examiner* — Ayaz R Sheikh
*Assistant Examiner* — Faiyazkhan Ghafoerkhan
(74) *Attorney, Agent, or Firm* — Womble Bond Dickinson (US) LLP

(57) ABSTRACT

Embodiments of this application disclose a communication method, a related device, and a system. The method includes: receiving, by a network device, a first preamble sequence that is sent by a first terminal in a time window; sending, by the network device, a response message to the first terminal based on the first preamble sequence; receiving, by the network device, a first message sent by the first terminal, where the first message includes information used to identify the first terminal; and sending, by the network device, a second message to a second terminal and the first terminal, where the second message is used to indicate that the first terminal and the second terminal belong to a same user equipment cooperative group. According to this application, efficiency of establishing a user equipment cooperative group can be improved.

9 Claims, 8 Drawing Sheets

(56) References Cited

U.S. PATENT DOCUMENTS

| | | | | |
|---|---|---|---|---|
| 2016/0014815 A1* | 1/2016 | Vajapeyam | ............ | H04W 4/70 |
| | | | | 370/329 |
| 2016/0381713 A1* | 12/2016 | Hwang | ............ | H04W 74/0833 |
| | | | | 370/329 |
| 2017/0019930 A1* | 1/2017 | Lee | ................... | H04W 72/0413 |
| 2017/0064620 A1* | 3/2017 | Wang | ................... | H04W 8/005 |
| 2017/0332419 A1* | 11/2017 | Kim | ...................... | H04L 1/1887 |
| 2017/0374702 A1* | 12/2017 | Lu | ......................... | H04W 76/14 |
| 2018/0279377 A1* | 9/2018 | Lin | ................... | H04W 72/0406 |
| 2019/0357305 A1* | 11/2019 | Su | ......................... | H04W 72/12 |
| 2019/0394805 A1* | 12/2019 | Kim | ...................... | H04W 52/36 |

FOREIGN PATENT DOCUMENTS

| | | | |
|---|---|---|---|
| CN | 103167613 A | 6/2013 | |
| CN | 103686985 A | 3/2014 | |
| CN | 104105103 A | 10/2014 | |
| CN | 104662817 A | 5/2015 | |
| CN | 104854947 A | 8/2015 | |
| EP | 2328379 A1 * | 6/2011 | ........ H04W 74/0833 |
| EP | 2328379 A1 | 6/2011 | |
| WO | 2016050175 A1 | 4/2016 | |
| WO | 2017039513 A1 | 3/2017 | |

\* cited by examiner

COMMUNICATION METHOD, RELATED DEVICE, AND SYSTEM

CROSS-REFERENCE TO RELATED APPLICATIONS

This application is a continuation of International Application No. PCT/CN2018/093355, filed on Jun. 28, 2018, which claims priority to Chinese Patent Application No. 201710637567.3, filed on Jul. 28, 2017, the disclosures of which are incorporated herein by reference in their entireties.

TECHNICAL FIELD

This application relates to the field of communications technologies, and in particular, to a communication method, a related device, and a system.

BACKGROUND

Wireless communications technologies have experienced rapid development over past decades, and have successively experienced analog communications system-based 1st Generation, 2nd Generation (2G) with global system for mobile communications (GSM) as a representative, 3rd Generation (3G) with wideband code division multiple access (WCDMA) as a representative, and then come to current long term evolution (LTE). In addition, a quantity of connected devices in wireless communication also continuously increases, and various new wireless services, for example, internet of things and virtual reality (VR), also emerge in a large quantity. This imposes a higher requirement on a next-generation wireless communications system, namely, 5th Generation (5G). 5G not only needs to support access of massive devices, but also needs to ensure communication quality of each accessed device. Persons skilled in the art are exploring implementation of cooperative communication performed by a plurality of user equipment. For example, first, when a base station needs to send data to a user equipment (UE), the base station sends the data to the user equipment and another user equipment nearby the user equipment, and the another user equipment forwards the data to the user equipment after receiving the data; then, the user equipment jointly decodes the data sent by the base station and the data forwarded by the another user equipment, to improve reception performance. How to reduce time used to establish a cooperative relationship among the plurality of user equipment is a problem that is being studied by the persons skilled in art.

SUMMARY

Embodiments of this application provide a communication method, a related device, and a system, to improve efficiency of establishing a user equipment cooperative group.

According to a first aspect, an embodiment of this application provides a communication method, and the method includes the following steps: first, receiving, by a network device, a preamble sequence that is sent by a first terminal in a time window; then, sending, by the network device, a response message to the first terminal based on the preamble sequence; subsequently, receiving, by the network device, a first message sent by the first terminal, where the first message includes information used to identify the first terminal; and finally, sending, by the network device, a second message to a second terminal and the first terminal, where the second message is used to indicate that the first terminal and the second terminal belong to a same user equipment cooperative group.

By performing the foregoing steps, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available physical random access channel (PRACH) in the time window after waiting, the first terminal sends the preamble sequence to the network device through the available PRACH; if the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the receiving, by a network device, a preamble sequence that is sent by a first terminal in a time window, the method further includes: sending, by the network device, indication information to the first terminal, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

According to a second aspect, an embodiment of this application provides a communication method, and the method includes the following steps: first, sending, by a first terminal, a preamble sequence to a network device in a time window; then, receiving, by the first terminal, a response message that is sent by the network device based on the preamble sequence; subsequently, sending, by the first terminal, a first message to the network device based on the response message, where the first message includes information used to identify the first terminal; and finally, receiving, by the first terminal, a second message that is sent by the network device based on the first message, where the second message is used to indicate that the first terminal and a second terminal belong to a same user equipment cooperative group.

By performing the foregoing steps, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the sending, by a first terminal, a preamble sequence to a network device in a time window, the method further includes: receiving, by the first terminal, indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, before the receiving, by the first terminal, a response message that is sent by the network device based on the preamble sequence, the method further includes: receiving, by the first terminal, a preamble sequence that is configured by the network device for the second terminal and that is sent by the second terminal. After receiving the preamble sequence sent by the second terminal, the first terminal can learn of the preamble sequence configured by the network device for the second terminal, and a time-frequency resource configured by the network device for the second terminal to send the preamble sequence. Therefore, an index of the preamble sequence configured by the network device for the second terminal and/or information about the time-frequency resource configured by the network device for the second terminal to send the preamble sequence may be subsequently included in the first message, to identify the second terminal.

According to a third aspect, an embodiment of this application provides a network device, where the network device includes a processor, a memory, and a transceiver, the memory is configured to store an instruction, and the processor is configured to invoke the instruction in the memory to perform the following operations: first, receiving, by using the transceiver, a preamble sequence that is sent by a first terminal in a time window. Then, sending a response message to the first terminal by using the transceiver based on the preamble sequence. Subsequently, receiving, by using the transceiver, a first message sent by the first terminal, where the first message includes information used to identify the first terminal; and finally, sending a second message to a second terminal and the first terminal by using the transceiver, where the second message is used to indicate that the first terminal and the second terminal belong to a same user equipment cooperative group.

In one embodiment, before receiving, by using the transceiver, the preamble sequence that is sent by the first terminal in the time window, the processor is further configured to send indication information to the first terminal by using the transceiver, where the indication information is used to indicate the time window.

According to a fourth aspect, an embodiment of this application provides a terminal, where the terminal may also be referred to as a first terminal subsequently, and the terminal includes a processor, a memory, and a transceiver. The memory is configured to store an instruction, and the processor is configured to invoke the instruction in the memory to perform the following operations: first, sending a preamble sequence to a network device by using the transceiver in a time window. Then, receiving, by using the transceiver, a response message that is sent by the network device based on the preamble sequence; subsequently, sending a first message to the network device by using the transceiver based on the response message, where the first message includes information used to identify the first terminal. Finally, receiving, by using the transceiver, a second message that is sent by the network device based on the first message, where the second message is used to indicate that the first terminal and a second terminal belong to a same user equipment cooperative group.

In one embodiment, before sending the preamble sequence to the network device by using the transceiver in the time window, the processor is further configured to: receive, by using the transceiver, indication information sent by the network device, where the indication information is used to indicate the time window.

In one embodiment, before receiving, by using the transceiver, the response message that is sent by the network device based on the preamble sequence, the processor is further configured to: receive, by the transceiver, a preamble sequence that is configured by the network device for the second terminal and that is sent by the second terminal.

According to a fifth aspect, an embodiment of this application provides a network device, where the network device includes a first receiving unit and a first sending unit. The first receiving unit is configured to receive a preamble sequence that is sent by a first terminal in a time window; the first sending unit is configured to send a response message to the first terminal based on the preamble sequence. The first receiving unit is further configured to receive a first message sent by the first terminal, where the first message includes information used to identify the first terminal. The first sending unit is further configured to send a second message to a second terminal and the first terminal, where the second message is used to indicate that the first terminal and the second terminal belong to a same user equipment cooperative group.

In one embodiment, the first sending unit is further configured to: before the first receiving unit receives the preamble sequence that is sent by the first terminal in the time window, send indication information to the first terminal, where the indication information is used to indicate the time window.

According to a sixth aspect, an embodiment of this application provides a terminal, where the terminal may also be referred to as a first terminal subsequently, and the terminal includes a second sending unit and a second receiving unit. The second sending unit is configured to send a preamble sequence to a network device in a time window. The second receiving unit is configured to receive a response message that is sent by the network device based on the preamble sequence. The second sending unit is further configured to send a first message to the network device based on the response message, where the first message includes information used to identify the first terminal; and the second receiving unit is further configured to receive a second message that is sent by the network device based on the first message, where the second message is used to indicate that the first terminal and a second terminal belong to a same user equipment cooperative group.

In one embodiment, the second receiving unit is further configured to: before the second sending unit sends the preamble sequence to the network device in the time window, receive indication information sent by the network device, where the indication information is used to indicate the time window.

In one embodiment, the second receiving unit is further configured to: before the second receiving unit receives the response message that is sent by the network device based on the preamble sequence, receive a preamble sequence that is configured by the network device for the second terminal and that is sent by the second terminal.

In another embodiment, the first message further includes the index of the preamble sequence configured by the network device for the second terminal, and the preamble sequence configured by the network device for the second terminal is used to identify the second terminal.

In yet another embodiment, the first message further includes the information about the time-frequency resource configured by the network device for the second terminal to send the preamble sequence, and the time-frequency resource configured by the network device for the second terminal to send the preamble sequence is used to identify the second terminal.

In still another embodiment, the first message further includes the index of the preamble sequence configured by the network device for the second terminal and the information about the time-frequency resource configured by the network device for the second terminal to send the preamble sequence, and the preamble sequence configured by the network device for the second terminal and the time-frequency resource configured by the network device for the second terminal to send the preamble sequence are used to jointly identify the second terminal.

According to a seventh aspect, an embodiment of this application provides a communications system. The communications system includes a network device and a terminal. The network device is the network device described with reference to any one of the third aspect or the embodiments of the third aspect, or with reference to any one of the fifth aspect or the embodiments of the fifth aspect. The terminal is the terminal described with reference to any one of the fourth aspect or the embodiments of the fourth aspect, or with reference to any one of the sixth aspect or the embodiments of the sixth aspect. In the third aspect, the fourth aspect, the fifth aspect, the sixth aspect, and the seventh aspect, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In some embodiments, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, after receiving the preamble sequence sent by the second terminal, the first terminal can learn of the preamble sequence configured by the network device for the second terminal, and a time-frequency resource configured by the network device for the second terminal to send the preamble sequence. Therefore, an index of the preamble sequence configured by the network device for the second terminal and/or information about the time-frequency resource configured by the network device for the second terminal to send the preamble sequence may be subsequently included in the first message, to identify the second terminal.

According to an eighth aspect, an embodiment of this application provides a communication method, and the method includes the following steps: first, receiving, by a network device, a preamble sequence sent by a first terminal. Then, sending, by the network device, a response message to the first terminal based on the preamble sequence; subsequently, receiving, by the network device, a first message sent by the first terminal, where the first message includes information used to identify the first terminal; and the first message further includes an index of a preamble sequence configured by the network device for a second terminal and/or information about a time-frequency resource configured by the network device for the second terminal to send the preamble sequence configured for the first terminal. Finally, sending, by the network device, a second message to the second terminal and the first terminal, where the second message is used to indicate that the first terminal and the second terminal belong to a same user equipment cooperative group.

By performing the foregoing steps, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

In one embodiment, the receiving, by a network device, a preamble sequence sent by a first terminal includes: receiving, by the network device, the preamble sequence that is sent by the first terminal in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the receiving, by a network device, a preamble sequence that is sent by a first terminal in a time window, the method further includes: sending, by the network device, indication information to the first terminal, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

According to a ninth aspect, an embodiment of this application provides a communication method, and the communication method includes the following steps: first, sending, by a first terminal, a preamble sequence to a network device; then, receiving, by the first terminal, a response message that is sent by the network device based on the preamble sequence. Subsequently, sending, by the first terminal, a first message to the network device based on the response message, where the first message includes information used to identify the first terminal. The first message further includes an index of a preamble sequence configured by the network device for a second terminal and/or information about a time-frequency resource configured by the network device for the second terminal to send the preamble sequence configured for the first terminal. Finally, receiving, by the first terminal, a second message that is sent by the network device based on the first message, where the second message is used to indicate that the first terminal and the second terminal belong to a same user equipment cooperative group.

By performing the foregoing steps, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

In one embodiment, the sending, by a first terminal, a preamble sequence to a network device includes: sending, by the first terminal, the preamble sequence to the network device in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the sending, by a first terminal, a preamble sequence to a network device in a time window, the method further includes: receiving, by the first terminal, indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

According to a tenth aspect, an embodiment of this application provides a network device, where the network device includes a processor, a memory, and a transceiver, the memory is configured to store an instruction, and the processor is configured to invoke the instruction in the memory to perform the following operations: first, receiving, by using the transceiver, a preamble sequence sent by a first terminal. Then, sending a response message to the first terminal by using the transceiver based on the preamble sequence; subsequently, receiving, by using the transceiver, a first message sent by the first terminal, where the first message includes information used to identify the first terminal; and the first message further includes an index of a preamble sequence configured by the network device for a second terminal and/or information about a time-frequency resource configured by the network device for the second terminal to send the preamble sequence configured for the first terminal. Finally, sending a second message to the second terminal and the first terminal by using the transceiver, where the second message is used to indicate that the first terminal and the second terminal belong to a same user equipment cooperative group.

In one embodiment, the transceiver is configured to receive, by using the transceiver, the preamble sequence that is sent by the first terminal in a time window.

In one embodiment, before the processor receives, by using the transceiver, the preamble sequence that is sent by the first terminal in the time window, the processor is further configured to send indication information to the first terminal by using the transceiver, where the indication information is used to indicate the time window.

According to an eleventh aspect, an embodiment of this application provides a terminal, where the terminal includes a processor, a memory, and a transceiver, the memory is configured to store an instruction, and the processor is configured to invoke the instruction in the memory to perform the following operations: first, sending a preamble sequence to a network device by using the transceiver. Then, receiving, by using the transceiver, a response message that is sent by the network device based on the preamble sequence. Subsequently, sending a first message to the network device by using the transceiver based on the response message, where the first message includes information used to identify the first terminal; and the first message further includes an index of a preamble sequence configured by the network device for a second terminal and/or information about a time-frequency resource configured by the network device for the second terminal to send the preamble sequence that is configured for the first terminal. Finally, receiving, by using the transceiver, a second message that is sent by the network device based on the first message, where the second message is used to indicate that the first terminal and the second terminal belong to a same user equipment cooperative group.

In one embodiment, the processor sends the preamble sequence to the network device by using the transceiver to send the preamble sequence to the network device in a time window.

In one embodiment, before the processor sends the preamble sequence to the network device by using the transceiver in the time window, the processor is further configured to receive, by using the transceiver, indication information sent by the network device, where the indication information is used to indicate the time window.

According to a twelfth aspect, an embodiment of this application provides a network device, where the network device includes a third receiving unit and a third sending unit. The third receiving unit is configured to receive a preamble sequence sent by a first terminal; the third sending unit is configured to send a response message to the first terminal based on the preamble sequence; the third receiving unit is further configured to receive a first message sent by the first terminal, where the first message includes information used to identify the first terminal; and the first message further includes an index of a preamble sequence configured by the network device for a second terminal and/or information about a time-frequency resource configured by the network device for the second terminal to send the preamble sequence that is configured for the first terminal; and the third sending unit is further configured to send a second message to the second terminal and the first terminal, where the second message is used to indicate that the first terminal and the second terminal belong to a same user equipment cooperative group.

In one embodiment, the third receiving unit is configured to receive the preamble sequence sent by the first terminal. The third receiving unit may be configured to receive the preamble sequence that is sent by the first terminal in a time window.

In one embodiment, the third sending unit is further configured to: before the third receiving unit receives the preamble sequence that is sent by the first terminal in the time window, send indication information to the first terminal, where the indication information is used to indicate the time window.

According to a thirteenth aspect, an embodiment of this application provides a terminal, where the terminal is also referred to as a first terminal, and the terminal includes a fourth sending unit and a fourth receiving unit. The fourth sending unit is configured to send a preamble sequence to a network device. The fourth receiving unit is configured to receive a response message that is sent by the network device based on the preamble sequence. The fourth sending unit is further configured to send a first message to the network device based on the response message, where the first message includes information used to identify the first terminal. The first message further includes an index of a preamble sequence configured by the network device for a second terminal and/or information about a time-frequency resource configured by the network device for the second terminal to send the preamble sequence that is configured for the first terminal; and the fourth receiving unit is further configured to receive a second message that is sent by the network device based on the first message, where the second message is used to indicate that the first terminal and the second terminal belong to a same user equipment cooperative group.

In one embodiment, the fourth sending unit is configured to send the preamble sequence to the network device. The fourth sending unit may be configured to send the preamble sequence to the network device in a time window.

In one embodiment, the fourth receiving unit is configured to: before the fourth sending unit sends the preamble sequence to the network device in the time window, receive indication information sent by the network device, where the indication information is used to indicate the time window.

According to a fourteenth aspect, an embodiment of this application provides a communications system. The communications system includes a network device and a terminal. The network device is the network device described in any one of the tenth aspect or the embodiments of the tenth aspect, or any one of the twelfth aspect or the embodiments of the twelfth aspect. The terminal is the terminal described in any one of the eleventh aspect or the embodiments of the eleventh aspect, or any one of the thirteenth aspect or the embodiments of the thirteenth aspect.

In the tenth aspect, the eleventh aspect, the twelfth aspect, the thirteenth aspect, and the fourteenth aspect, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

In some embodiments, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In some embodiments, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

According to a fifteenth aspect, an embodiment of this application provides a storage medium, where the storage medium is configured to store an instruction. When the instruction is run on a processor of a network device, the network device performs the method described in any one of the first aspect or the embodiments of the first aspect, or any one of the seventh aspect or the embodiments of the seventh aspect. Alternatively, when the instruction is run on a processor of a terminal, the terminal performs the method described in any one of the second aspect or the embodiments of the second aspect, or any one of the eighth aspect or the embodiments of the eighth aspect.

According to a sixteenth aspect, an embodiment of this application provides a computer program product including an instruction. When the computer program product including the instruction is run on a network device, the network device is enabled to perform the method described in any one of the first aspect or the embodiments of the first aspect, or any one of the seventh aspect or the embodiments of the seventh aspect. Alternatively, when the computer program product including the instruction is run on a terminal, the terminal is enabled to perform the method described in any one of the second aspect or the embodiments of the second aspect, or any one of the eighth aspect or the embodiments of the eighth aspect.

By implementing the embodiments of this application, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1A:
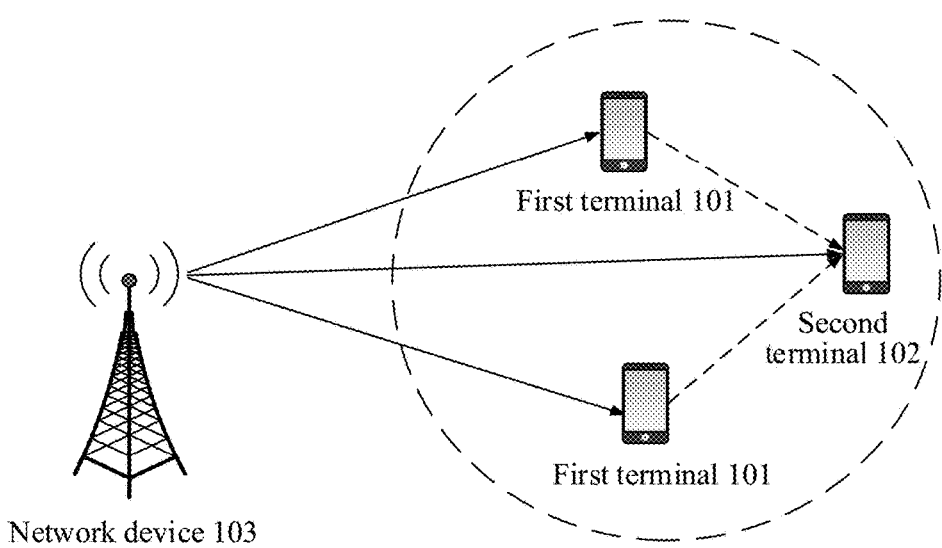
FIG. 1A is a schematic structural diagram of a communications system according to an embodiment.

FIG. 1A is a schematic structural diagram of a communications system according to an embodiment. The communications system includes a first terminal 101 (where only two first terminals are used as an example in FIG. 1A for illustration), a second terminal 102, and a network device 103, and the communications system may further include another device. In one embodiment, the devices in the communications system 10 may perform communication by using a wireless communications technology. For example, the wireless communications technology may be the 2G, 3G, LTE, 4th generation mobile communications technology (4G), 5G, or wireless fidelity (WI-FI) technology, another existing communications technology, or a subsequently studied communications technology. The first terminal 101 and the second terminal 102 may be a handheld device (for example, a mobile phone, a tablet computer, and a palmtop computer) having a wireless communication function, a vehicle-mounted device (for example, an automobile, a bicycle, an electric vehicle, an airplane, and a ship), a wearable device (for example, a smartwatch, a smart band, and a pedometer), a smart household device (for example, a refrigerator, a television, an air conditioner, and an electric meter), a smart robot, a workshop device, another processing device that can be connected to a wireless modem, and user equipment, mobile stations (MS), terminals, terminal devices (terminal equipment), and the like in various forms. The network device 103 may be a base station, for example, a base station in 5G, a base station in 4G, or any other device that can implement a wireless network access function. In this embodiment of this application, how to establish a cooperative relationship between the first terminal 101 and the second terminal 102 is to be described.

Figure 1B:
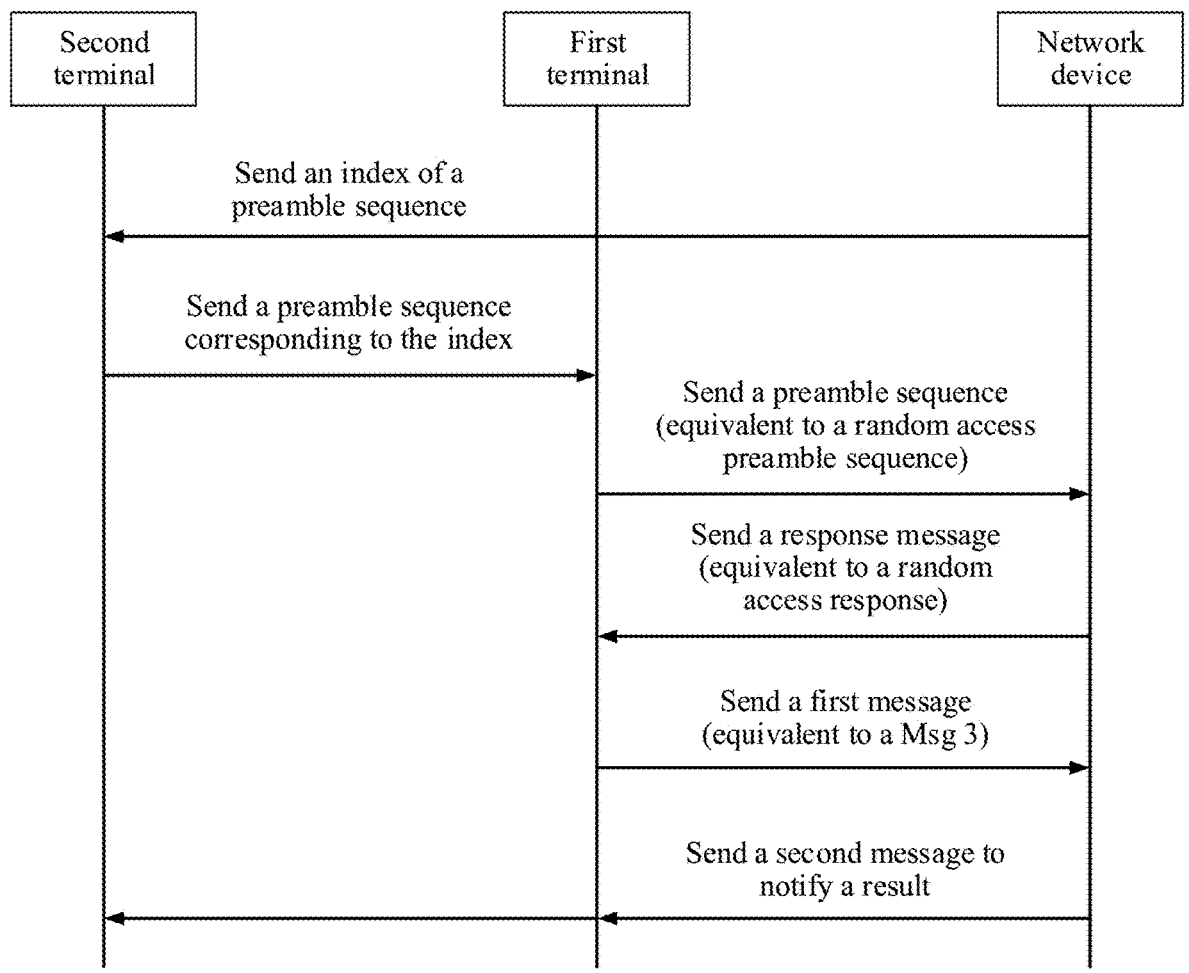
FIG. 1B is a schematic flowchart for establishing a cooperative relationship according to an embodiment.

In one embodiment, a procedure for establishing the cooperative relationship between the first terminal 101 and the second terminal 102 is substantially the same as a random access procedure. The following describes, with reference to FIG. 1B, a general procedure for establishing the cooperative relationship between the first terminal 101 and the second terminal 102. In a method shown in FIG. 1B, a network device sends an index of a preamble sequence to a second terminal by using radio resource control (RRC) signaling, and then the second terminal sends a preamble sequence corresponding to the index to a first terminal, to trigger the first terminal to interact with the network device. Correspondingly, the first terminal sends the preamble sequence (equivalent to a "random access preamble sequence" in a random access process) to the network device; after receiving the preamble sequence, the network device sends a response message (equivalent to a "random access response" in the random access process) to the first terminal. After receiving the response message, if the first terminal is willing to establish a cooperative relationship with the second terminal, the first terminal may send a first message (equivalent to a "Msg 3" in the random access process) to the network device, where the first message may include an identifier of the first terminal, so that the network device can identify the first terminal. After receiving the first message, the network device can determine to establish the cooperative relationship between the first terminal and the second terminal, and then the network device sends a second message to the first terminal and the second terminal to notify the establishment of the cooperative relationship. Detailed information in the procedure shown in FIG. 1B is to be further described in a method shown in FIG. 2.

Figure 2:
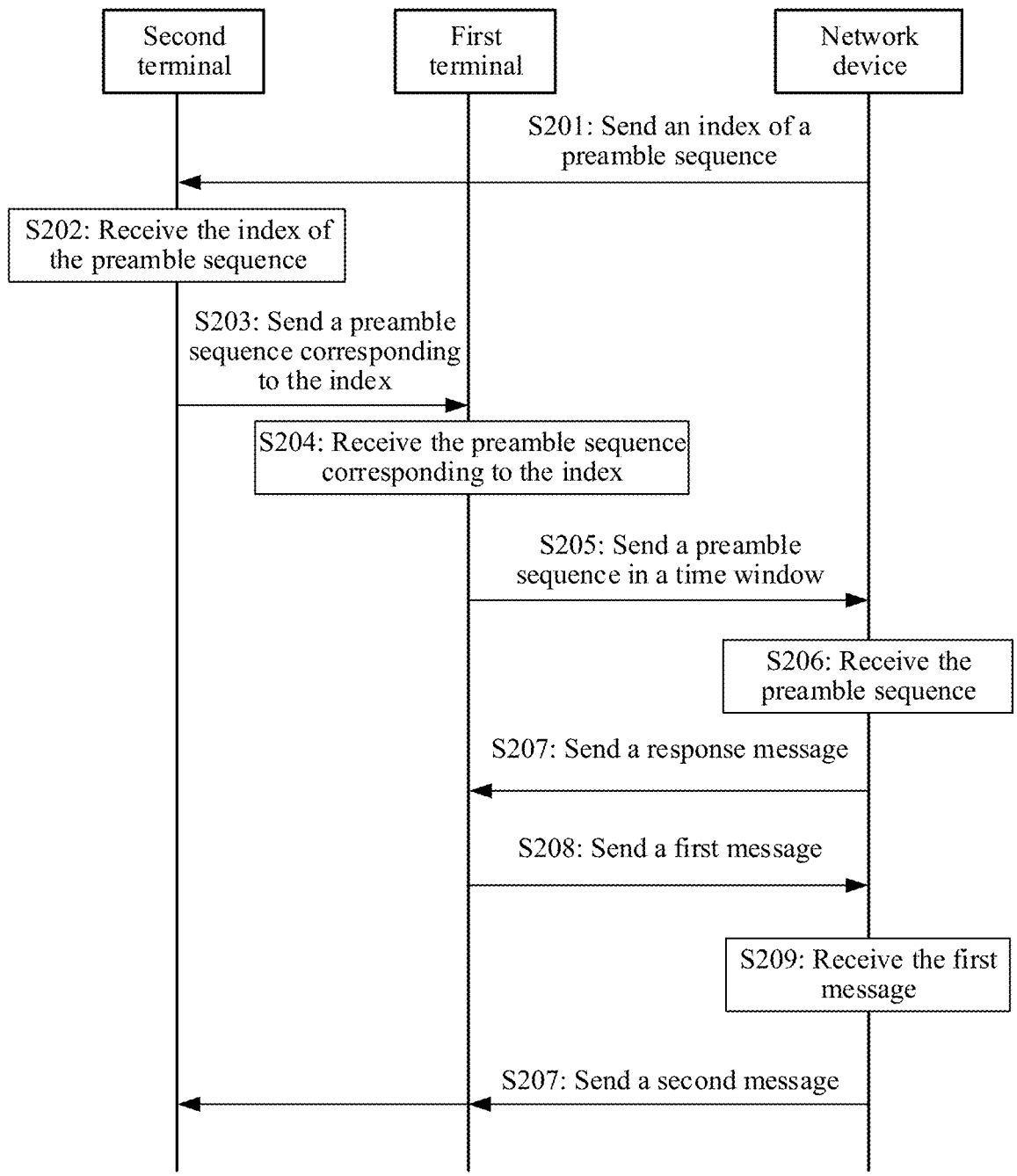
FIG. 2 is a schematic flowchart of a communications method according to an embodiment.

FIG. 2 shows a communication method according to an embodiment. The method may be implemented based on the communications system shown in FIG. 1A. The method includes but is not limited to the following steps.

Step S201: A network device sends an index of a preamble sequence to a second terminal.

In one embodiment, the network device sends a configuration message to the second terminal. The configuration message may be radio resource control RRC signaling, the configuration message includes the index of the preamble sequence, and a preamble sequence corresponding to the index of the preamble sequence that is included in the configuration message is a preamble sequence configured by the network device for the second terminal. In addition to configuring the preamble sequence for the second terminal, the network device may further configure a preamble sequence for any other terminal in addition to the second terminal. There may be one or more other terminals. The network device may further configure, for the second terminal and the other terminal, time-frequency resources that are required to send the preamble sequences. For example, the configuration information includes an index $l_{D2D\text{-}preamble}$ of the preamble sequence configured for the second terminal, and time information and frequency information of the time-frequency resource used to send the preamble sequence. The frequency information may include a sequence number $n_{PRB}^{D2D\text{-}PRACH}$ of a start resource block (RB) of the time-frequency resource in frequency domain, and may further include bandwidth $f_{D2D\text{-}PRACH}$ occupied by the time-frequency resource. The time information includes information such as a period $T_{D2D\text{-}PRACH}$ of the preamble sequence configured for the second terminal and a subframe offset $\Delta_{D2D\text{-}PRACH}$ in the period. A subframe number $\lfloor n_s/2 \rfloor$ of a subframe in which the time-frequency resource is located needs to meet the following conditions:

$$(10n_f + \lfloor n_s/2 \rfloor - \Delta_{D2D\text{-}PRACH}) \bmod T_{D2D\text{-}PRACH} = 0 \qquad 1\text{-}1$$

In the formula 1-1, $n_f$ is a system frame number, and $n_s$ is a slot number in a system frame.

Figure 3:
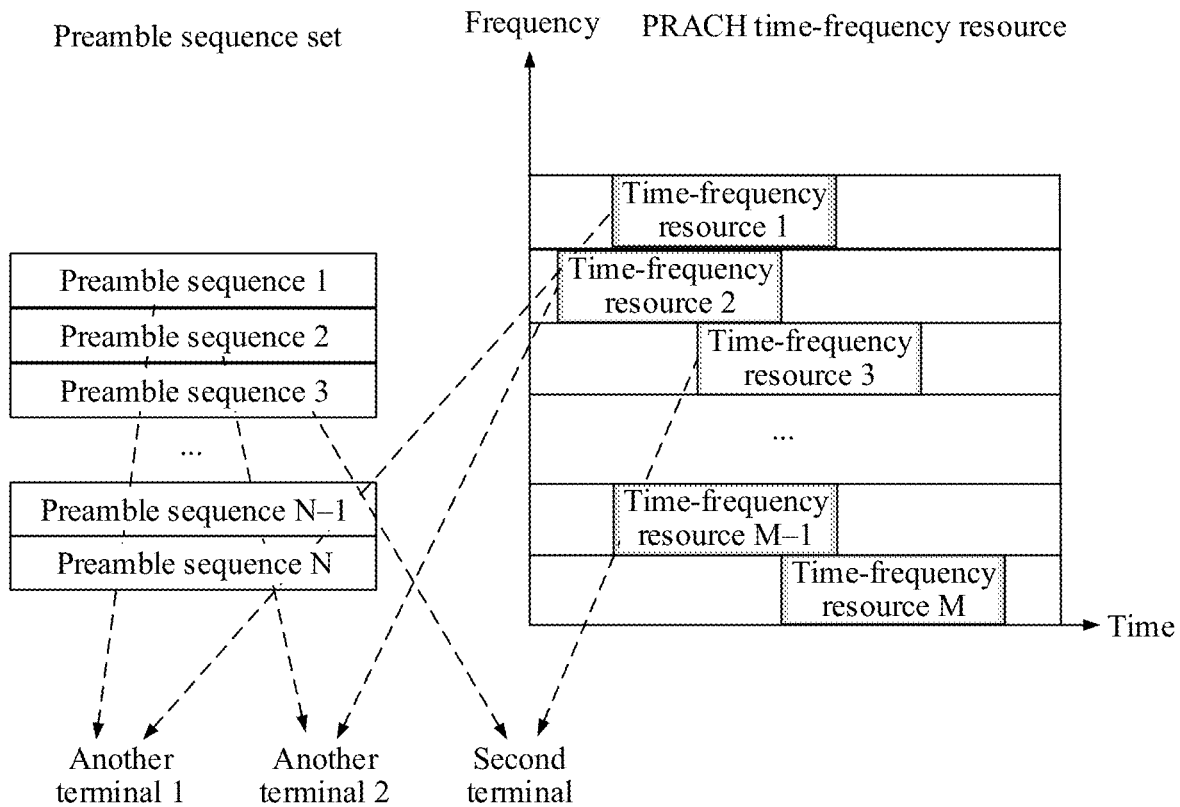
FIG. 3 is a schematic diagram of a scenario of sending a preamble sequence according to an embodiment.

In this embodiment, the preamble sequence configured for the second terminal may be referred to as a first preamble sequence, the preamble sequence configured for the other terminal may be referred to as a second preamble sequence, the time-frequency resource configured for the second terminal to send the first preamble sequence may be referred to as a first time-frequency resource, and the time-frequency resource configured for the other terminal to send the second preamble sequence may be referred to as a second time-frequency resource. In this case, there are at least the following three possible cases for a relationship between the first preamble sequence and the second preamble sequence, and a relationship between the first time-frequency resource and the second time-frequency resource:

Case 1: The first preamble sequence is different from the second preamble sequence or the first time-frequency resource is different from the second time-frequency resource. The network device may identify the second terminal by using the first preamble sequence and the first time-frequency resource jointly, and identify the other terminal by using the second preamble sequence and the second time-frequency resource jointly. For example, FIG. 3 shows preamble sequences configured for the second terminal and the other terminal and time-frequency resources used to send the preamble sequences. It is assumed that there are a plurality of other terminals and the plurality of other terminals include another terminal 1 and another terminal 2. The preamble sequence configured for the second terminal is a preamble sequence 3, and the time-frequency resource configured for the second terminal to send the preamble sequence 3 is a time-frequency resource 3; the preamble sequence configured for the another terminal 1 is a preamble sequence 1, and the time-frequency resource configured for the another terminal 1 to send the preamble sequence 1 is a time-frequency resource 1; and the preamble sequence configured for the another terminal 2 is a preamble sequence 2, and the time-frequency resource configured for the another terminal 2 to send the preamble sequence 2 is a time-frequency resource 2. In this case, the preamble sequence 3 and the time-frequency resource 3 may be used to jointly identify the second terminal, the preamble sequence 1 and the time-frequency resource 1 may be used to jointly identify the another terminal 1, and the preamble sequence 2 and the time-frequency resource 2 may be used to jointly identify the another terminal 2. In this case, the network device can uniquely determine the second terminal based on the preamble sequence 3 and the time-frequency resource 3, uniquely determine the another terminal 1 based on the preamble sequence 1 and the time-frequency resource 1, and uniquely determine the another terminal 2 based on the preamble sequence 2 and the time-frequency resource 2.

Figure 4:
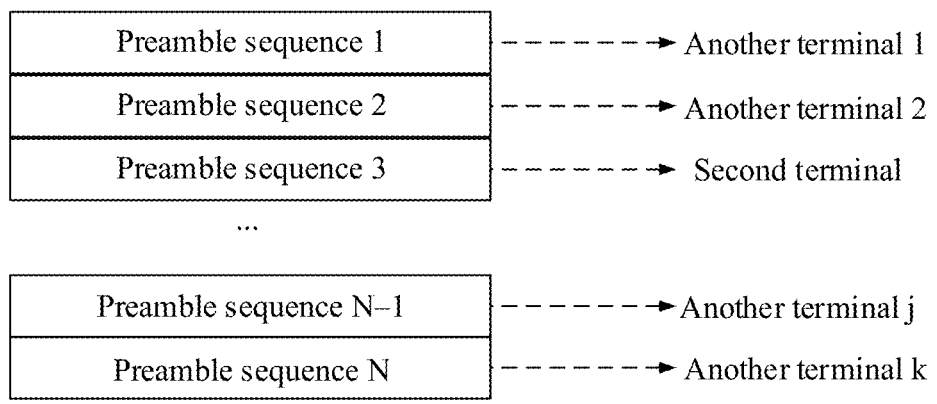
FIG. 4 is a schematic diagram of another scenario of sending a preamble sequence according to an embodiment.

Case 2: The first preamble sequence is different from the second preamble sequence, and the first time-frequency resource is the same as or different from the second time-frequency resource. The network device identifies the second terminal by using the first preamble sequence, and identifies the other terminal by using the second preamble sequence. For example, FIG. 4 shows preamble sequences configured for the second terminal and the other terminal. The other terminal is another terminal 1 and another terminal 2. The preamble sequence configured for the second terminal is a preamble sequence 3, the preamble sequence configured for the another terminal 1 is a preamble sequence 1, and the preamble sequence configured for the another terminal 2 is a preamble sequence 2. In this case, the preamble sequence 3 may be used to identify the second terminal, the preamble sequence 1 may be used to identify the another terminal 1, and the preamble sequence 2 may be used to identify the another terminal 2. In this case, the network device can uniquely determine the second terminal based on the preamble sequence 3, uniquely determine the another terminal 1 based on the preamble sequence 1, and uniquely determine the another terminal 2 based on the preamble sequence 2.

Case 3: The first preamble sequence is the same as or different from the second preamble sequence, and the first time-frequency resource is different from the second time-frequency resource. The network device may identify the second terminal by using the first time-frequency resource, and identify the other terminal by using the second time-frequency resource. For example, the other terminal is another terminal 1 and another terminal 2. The time-frequency resource configured for the second terminal is a time-frequency resource 3, the time-frequency resource configured for the another terminal 1 is a time-frequency resource 1, and the time-frequency resource configured for the another terminal 2 is a time-frequency resource 2. In this case, the time-frequency resource 3 may be used to identify the second terminal, the time-frequency resource 1 may be used to identify the another terminal 1, and the time-frequency resource 2 may be used to identify the another terminal 2. In this case, the network device can uniquely determine the second terminal based on the time-frequency resource 3, uniquely determine the another terminal 1 based on the time-frequency resource 1, and uniquely determine the another terminal 2 based on the time-frequency resource 2.

Step S202: The second terminal receives configuration information of the preamble sequence.

In one embodiment, the second terminal receives the configuration message and parses out the index of the preamble sequence that is in the configuration message. The second terminal further parses out information (for example, time information or frequency information) about a time-frequency resource that is in the configuration message. The preamble sequence corresponding to the index is the preamble sequence configured for the second terminal. A time-frequency resource indicated by the information about the time-frequency resource is the time-frequency resource that is configured for the second terminal and that is used by the second terminal to send the preamble sequence (namely, the preamble sequence configured for the second terminal).

Step S203: The second terminal sends the preamble sequence corresponding to the index to a first terminal nearby.

In one embodiment, the second terminal may send the preamble sequence corresponding to the index to the first terminal nearby in a broadcast or unicast manner. In one embodiment, if the second terminal does not know specific first terminals nearby, the second terminal may send the preamble sequence corresponding to the index to the first terminals nearby in a broadcast manner. If the second terminal knows specific first terminals nearby, the second terminal may send the preamble sequence corresponding to the index to the first terminals nearby in a broadcast or unicast manner.

Step S204: The first terminal nearby receives the preamble sequence.

Step S205: M first terminals each send a preamble sequence to the network device in a time window.

Figure 5:
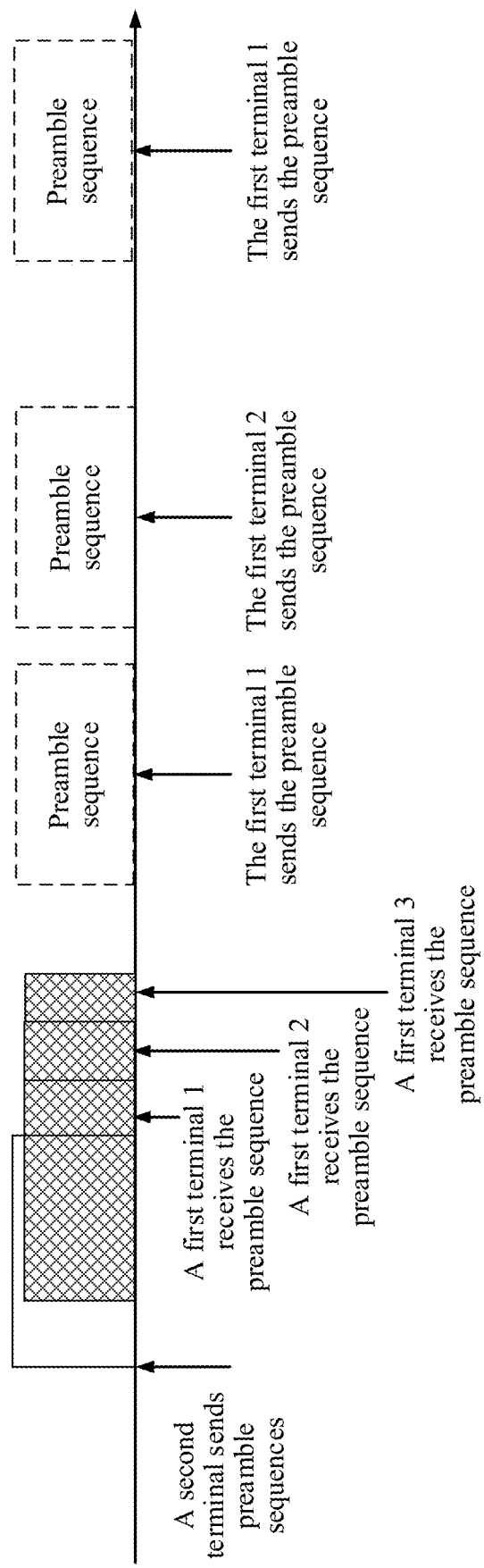
FIG. 5 is a schematic diagram of another scenario of sending a preamble sequence according to an embodiment.

In one embodiment, it may be considered that first terminals nearby the second terminal receive the preamble sequence sent by the second terminal, and the first terminals that can send a preamble sequence to the network device in the time window are the M first terminals. For ease of subsequent description, M is a positive integer. In the prior art, when a terminal needs to send a preamble sequence, the terminal may send the preamble sequence on an available physical random access channel (PRACH). If there is no available PRACH currently, the terminal sends the random access preamble sequence on a next available PRACH. In this embodiment of this application, because there may be many first terminals nearby the second terminal, if many first terminals wait for available PRACHs, the network device may take a relatively long time to receive the preamble sequence consequently, and execution efficiency of a subsequent procedure may be restricted. As shown in FIG. 5, FIG. 5 illustrates, with reference to a timeline, operations performed by a second terminal and three first terminals. The three first terminals may be denoted as a first terminal 1, a first terminal 2, and a first terminal 3. Blocks above the second terminal indicate duration of preamble sequences sent by the second terminal to the first terminals nearby. The first terminal 1, the first terminal 2, and the first terminal 3 receive, at different time points, the preamble sequences sent by the second terminal, because distances from the first terminal 1, the first terminal 2, and the first terminal 3 to the second terminal are different, and consequently there are different transmission delays. It can be learned from FIG. 5 that duration is relatively long from a moment at which the first terminal 3 receives the preamble sequence sent by the second terminal to a moment at which the first terminal 3 sends the preamble sequence to the network device. This is because a time point at which a PRACH is available for the first terminal 3 is relatively far away from a time point at which the first terminal 3 successfully receives the preamble sequence sent by the second terminal.

Figure 6:
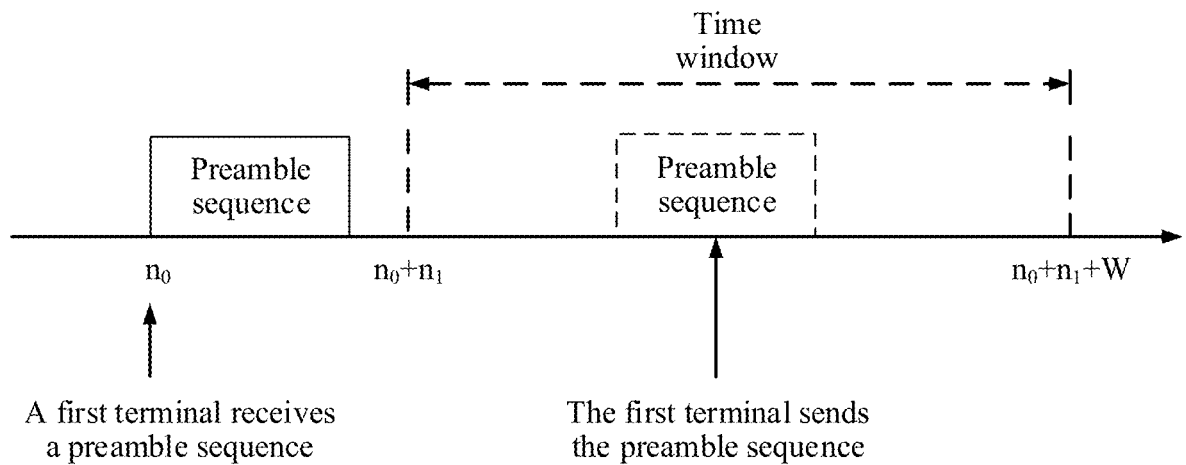
FIG. 6 is a schematic diagram of a scenario of a time window according to an embodiment.

To avoid a waste of a relatively long time, this embodiment proposes to configure a time window for the first terminal, and the first terminal may send the preamble sequence to the network device in the time window. If the first terminal does not have an available PRACH in the time window, the first terminal does not send the preamble sequence to the network device. The time window has a time domain start location, a time domain end location, and a time domain length, and the time domain length of the time window is a time length from the time domain start location to the time domain end location. Therefore, configuring at least two of the time domain start location, the time domain end location, and the time domain length is equivalent to configuring one time window. In one embodiment, the time window may be configured by sending indication information (for example, RRC signaling) by the second terminal to the first terminal, or the time window may be configured by the network device by sending indication information (for example, RRC signaling) to the first terminal. Alternatively, the time window may be predefined in the first terminal or configured in another manner. For example, after receiving a preamble sequence sent by the second terminal, the first terminal may send the preamble sequence to the network device in a time window from an $n_1^{th}$ subframe to an $(n_1+W)^{th}$ subframe. If there is no available PRACH in the subsequent time window from the $n_1^{th}$ subframe to the $(n_1+W)^{th}$ subframe, the first terminal does not send the preamble sequence to the network device. As shown in FIG. 6, if a first terminal receives, in an $n_0^{th}$ subframe, a preamble sequence sent by the second terminal, a time window of the first terminal is from an $(n_0+n_1)^{th}$ subframe to an $(n_0+n_1+W)^{th}$ subframe, where all of $n_0$, $n_1$, and W are integers greater than or equal to 0. The first terminal can detect a time at which the first terminal receives the preamble sequence sent by the second terminal. Therefore, the parameter $n_0$ may be obtained by the first terminal. In addition, the parameters $n_1$ and W may be configured.

In addition, a preamble sequence sent by the first terminal to the network device is different from a preamble sequence sent by the second terminal to the first terminal.

Step S206: The network device receives the preamble sequences that are sent by the M first terminals in the time window.

Step S207: The network device sends a response message to the M first terminals based on the preamble sequences.

Correspondingly, the M first terminals receive the response message. Alternatively, the network device may receive the preamble sequences sent by the M first terminals, but the network device sends the response message to only some of the M first terminals. For example, the network device sifts some first terminals out from the M first terminals according to a predefined rule, and then sends the response message to the sifted some first terminals. In this case, the some first terminals receive the response message. It is also possible that a few first terminals in the some first terminals have poor link status. In this case, in the some first terminals, only a first terminal other than the few first terminals may receive the response message.

Step S208: A first terminal that is in the M first terminals and that has received the response message sends a first message to the network device.

In one embodiment, all the first terminals that have received the response message may send the first message, or some first terminals that have received the response message may send the first message. For example, some first terminals are selected, based on a predefined policy, from all the first terminals that have received the response message, and the selected first terminals send the first message to the network device.

In one embodiment, each first message includes an identifier of the preamble sequence (that is, the preamble sequence configured by the network device for the second terminal) sent by the second terminal to each first terminal. The first message may further include other information, for example, information about a time-frequency resource that is used by the second terminal to send the preamble sequence and that is determined when the first terminal that sends the first message receives the preamble sequence sent by the second terminal. Each first message includes the same information about the time-frequency resource (for example, time information and frequency information of the time-frequency resource, and a number that can be used to identify the time-frequency resource) used by the second terminal to send the preamble sequence. In addition, each first message further includes an identifier of a first terminal that sends the first message. For example, it is assumed that all of the first terminal 1, the first terminal 2, and the first terminal 3 are first terminals that have sent the first message. In this case, the first message sent by the first terminal 1 includes an identifier of the first terminal 1, the first message sent by the first terminal 2 includes an identifier of the first terminal 2, and the first message sent by the first terminal 3 includes an identifier of the first terminal 3. In this way, the network device can determine, based on an identifier of a first terminal that is in the first message, the first terminal that has sent the first message. The identifier of the first terminal may be an international mobile equipment identity (IMEI) and a cell radio network temporary identifier (C-RNTI) of the first terminal.

Step S209: The network device receives the first message that is sent based on the response message.

Step S210: The network device sends a second message to the second terminal and the first terminal that has sent the first message.

In one embodiment, the network device parses a first message to obtain information included in the first message. For example, the network device obtains an identifier of a first terminal that is included in the first message, and then determines, based on the identifier, the specific first terminal that has sent the first message. By using this method, the network device can determine specific first terminals that are in the M first terminals and that have sent the first message. Then, the network device determines all or some of the first terminals that have sent the first message as cooperating terminals of the second terminal, thereby forming a user equipment cooperative group including the second terminal and the cooperating terminals. The cooperating terminal of the second terminal is configured to cooperate with the second terminal to receive and send data. For example, when the network device needs to send data to the second terminal, the network device sends the to-be-sent data to the second terminal and the cooperating terminal of the second terminal, and the cooperating terminal of the second terminal forwards the data to the second terminal after receiving the data. In this way, data transmission quality can be improved.

In one embodiment, after parsing the first message, the network device may further obtain an index of a preamble sequence, information about a time-frequency resource, and the like that are included in the first message. Corresponding to the foregoing three possible cases, functions of the information may be as follows:

On the premise of the case 1, the network device may find, based on the index of the preamble sequence that is in the first message, a preamble sequence corresponding to the index, and find, based on the information about the time-frequency resource that is in the first message, a time-frequency resource indicated by the information about the time-frequency resource. The preamble sequence is configured by the network device for the second terminal, and the time-frequency resource is configured by the network device for the second terminal to send the preamble sequence. Therefore, the network device can determine the corresponding second terminal based on the preamble sequence corresponding to the index in the first message and the time-frequency resource indicated by the information about the time-frequency resource that is in the first message, to determine that the first terminal that sends the first message attempts to establish a cooperative relationship with the second terminal rather than with another terminal. To be specific, if a preamble sequence corresponding to an index of a preamble sequence that is included in a first message sent by a first terminal is a preamble sequence configured by the network device for the second terminal, and a time-frequency resource indicated by information about a time-frequency resource that is included in the first message is a time-frequency resource configured by the network device for the second terminal to send the time-frequency resource, the network device determines the first terminal as a cooperating terminal of the second terminal, that is, determines that the first terminal and the second terminal belong to a same user equipment cooperative group.

On the premise of the case 2, the network device may find, based on the index of the preamble sequence that is in the first message, a preamble sequence corresponding to the index. The preamble sequence is configured by the network device for the second terminal, sent by the second terminal to the first terminal, and fed back by the first terminal to the network device. Therefore, the network device can determine the second terminal based on the preamble sequence corresponding to the index in the first message, to determine that the first terminal that sends the first message attempts to establish a cooperative relationship with the second terminal rather than with another terminal. To be specific, if a preamble sequence corresponding to an index of a preamble sequence that is included in a first message sent by a first terminal is a preamble sequence configured by the network device for the second terminal, the network device determines the first terminal as a cooperating terminal of the second terminal.

On the premise of the case 3, the network device may find, based on the information about the time-frequency resource that is in the first message, a time-frequency resource indicated by the information about the time-frequency resource. The time-frequency resource is configured by the network device for the second terminal to send the preamble sequence. Therefore, the network device can determine the second terminal based on the time-frequency resource indicated by the information about the time-frequency resource that is in the first message, to determine that the first terminal that sends the first message attempts to establish a cooperative relationship with the second terminal rather than with another terminal. To be specific, if a time-frequency resource indicated by information about a time-frequency resource that is included in a first message sent by a first terminal is a time-frequency resource configured by the network device for the second terminal to send a preamble sequence, the network device determines the first terminal as a cooperating terminal of the second terminal.

When the network device determines that the first terminal that has sent the first message is the cooperating terminal of the second terminal, the network device sends a second message to the second terminal and the first terminal that has sent the first message. The second message carries an identifier of a user equipment cooperative group. The second terminal and the first terminal that has sent the first message receive the same identifier of the user equipment cooperative group. It indicates that the second terminal and the first terminal that has sent the first message belong to the same user equipment cooperative group. In one embodiment, the second message sent to the second terminal and the second message sent to the cooperating terminal may be the same or may be different. Further, the second message sent to the second terminal may include an identifier of each first terminal that has sent the first message, so that the second terminal learns that the second terminal and the first terminal belong to a same user equipment cooperative group. The second message sent to each first terminal may include an identifier of the second terminal, so that the first terminal learns that the first terminal and the second terminal belong to a same user equipment cooperative group. For example, the second message includes an identifier of the same user equipment cooperative group, an identifier of the second terminal, and an identifier of a first terminal that has sent the first message.

In one embodiment, the network device may generate a random access radio temporary identifier (RA-RNTI) based on at least one of the index of the preamble sequence and the information about the time-frequency resource that are in the first message. The RA-RNTI is used to scramble data that needs to be sent by the network device to the second terminal, and the network device subsequently sends the scrambled data to the second terminal and the cooperating terminal of the second terminal. Formulas 1-2 and 1-3 are two optional formulas for calculating the RA-RNTI in this embodiment of this application, and are as follows:

$$\text{RA-RNTI} = 1 + l_{D2D\text{-}preamble} + N_{D2D\text{-}preamble} \cdot (t_{D2D\text{-}preamble} + 10 \cdot f_{D2D\text{-}preamble}) \quad 1\text{-}2$$

$$\text{RA-RNTI} = 1 + l_{D2D\text{-}preamble} \quad 1\text{-}3$$

In the formulas 1-2 and 1-3, $t_{D2D\text{-}preamble}$ and $f_{D2D\text{-}preamble}$ are information about a time-frequency resource that is included in the first message, $t_{D2D\text{-}preamble}$ is time information of the time-frequency resource (for example, a sequence number of a subframe in a system frame), $f_{D2D\text{-}preamble}$ is frequency resource information of the time-frequency resource (for example, a sequence number of a start RB), $l_{D2D\text{-}preamble}$ is an index of a preamble sequence that is included in the first message, $N_{D2D\text{-}preamble}$ is a total quantity of preamble sequences in a preamble sequence table in which a preamble sequence corresponds to the index $l_{D2D\text{-}preamble}$ is located $0 \leq l_{D2D\text{-}preamble} < N_{D2D\text{-}preamble}$, and the preamble sequences in the preamble sequence table and the preamble sequence corresponding to the index $l_{D2D\text{-}preamble}$ are preamble sequences of a same type. For example, all are preamble sequences used to establish a user equipment cooperative group.

Step S211: The second terminal and the first terminal that has sent the first message receive the second message.

In one embodiment, after receiving the second message, the first terminal may learn, based on an identifier of a user equipment cooperative group that is in the second message, a specific user equipment cooperative group in which the first terminal is located. Similarly, after receiving the second message, the second terminal may learn, based on the identifier of the user equipment cooperative group that is in the second message, a specific user equipment cooperative group in which the second terminal is located.

In one embodiment, the second terminal generates an RA-RNTI by using a method the same as that used by the network device, to descramble data that is sent by the network device to the second terminal, or data that is sent by the network device and that is forwarded by the first terminal to the second terminal.

In the method described in FIG. 2, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH; if the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

The method according to the embodiments of this application is described above in detail, and apparatuses according to the embodiments of this application are described below.

Figure 7:
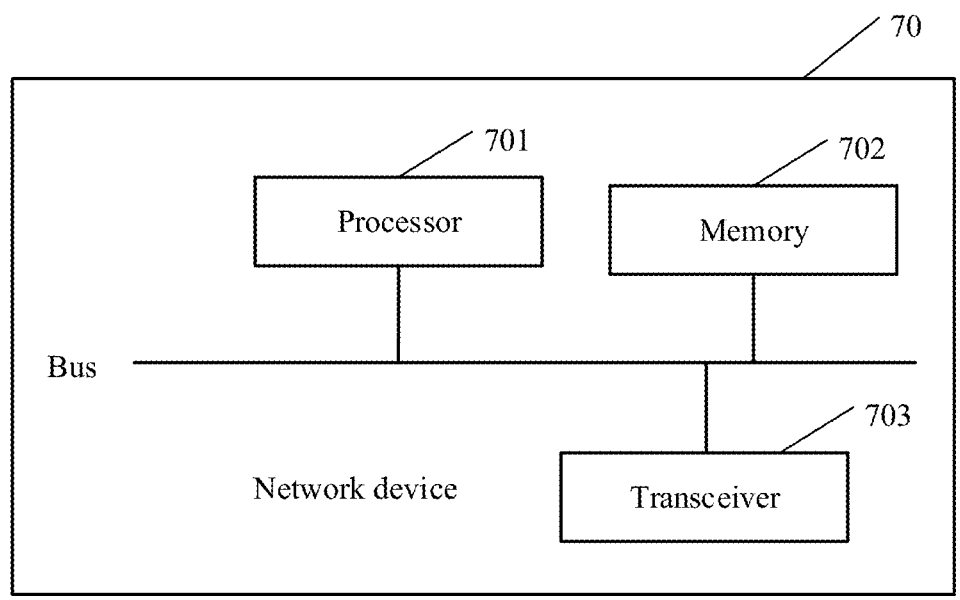
FIG. 7 is a schematic structural diagram of a network device according to an embodiment.

FIG. 7 shows a network device 70 according to an embodiment. The network device 70 includes a processor 701, a memory 702, and a transceiver 703. The processor 701, the memory 702, and the transceiver 703 are connected to each other by using a bus.

The memory 702 includes, but is not limited to, a random access memory (RAM), a read-only memory (ROM), an erasable programmable read-only memory (EPROM), or a compact disc read-only memory (CD-ROM). The memory 702 is configured to store a related instruction and related data. The transceiver 703 is configured to receive and send data.

The processor 701 may be one or more central processing units (CPU). When the processor 701 is one CPU, the CPU may be a single-core CPU or a multi-core CPU.

The processor 701 in the network device 70 is configured to read program code stored in the memory 702, to perform the following operations:

first, receiving, by using the transceiver 703, a preamble sequence that is sent by a first terminal in a time window;

then, sending a response message to the first terminal by using the transceiver 703 based on the preamble sequence;

subsequently, receiving, by using the transceiver 703, a first message sent by the first terminal, where the first message includes information used to identify the first terminal; and finally, sending a second message to a second terminal and the first terminal by using the transceiver 703, where the second message is used to indicate that the first terminal and the second terminal belong to a same user equipment cooperative group.

In one embodiment, before receiving, by using the transceiver 703, the preamble sequence that is sent by the first terminal in the time window, the processor 701 is further configured to send indication information to the first terminal by using the transceiver 703, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, the first message further includes an index of a preamble sequence configured by the network device for the second terminal, and the preamble sequence configured by the network device for the second terminal is used to identify the second terminal.

In one embodiment, the first message further includes information about a time-frequency resource configured by the network device for the second terminal to send a preamble sequence, and the time-frequency resource configured by the network device for the second terminal to send the preamble sequence is used to identify the second terminal.

In one embodiment, the first message further includes an index of a preamble sequence configured by the network device for the second terminal and information about a time-frequency resource configured by the network device for the second terminal to send the preamble sequence, and the preamble sequence configured by the network device for the second terminal and the time-frequency resource configured by the network device for the second terminal to send the preamble sequence are used to jointly identify the second terminal.

It should be noted that alternatively, for implementation of each operation, refer to the corresponding description of the method embodiment shown in FIG. 2.

In the network device 70 described in FIG. 7, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH; if the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

Figure 8:
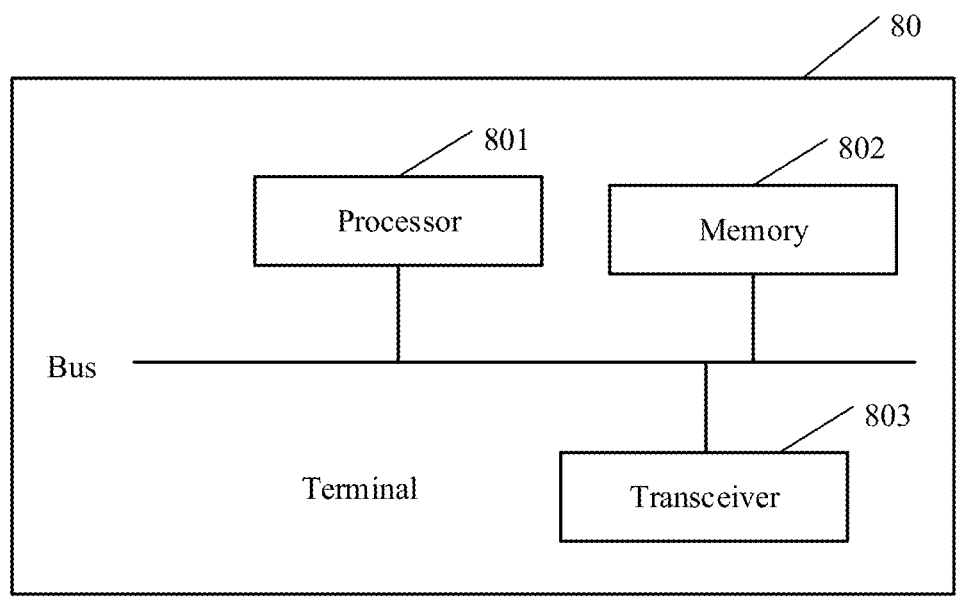
FIG. 8 is a schematic structural diagram of a terminal according to an embodiment.

FIG. 8 shows a terminal 80 according to an embodiment. The terminal may also be referred to as a first terminal. The terminal 80 includes a processor 801, a memory 802, and a transceiver 803. The processor 801, the memory 802, and the transceiver 803 are connected to each other by using a bus.

The memory 802 includes, but is not limited to, a RAM, a ROM, an EPROM, or a CD-ROM. The memory 802 is configured to store a related instruction and related data. The transceiver 803 is configured to receive and send data.

The processor 801 may be one or more CPUs. When the processor 801 is one CPU, the CPU may be a single-core CPU or a multi-core CPU.

The processor 801 in the terminal 80 is configured to read program code stored in the memory 802, to perform the following operations:

first, sending a preamble sequence to a network device by using the transceiver 803 in a time window; then, receiving, by using the transceiver 803, a response message that is sent by the network device based on the preamble sequence. Subsequently, sending a first message to the network device by using the transceiver 803 based on the response message, where the first message includes information used to identify the first terminal; and finally, receiving, by using the transceiver 803, a second message that is sent by the network device based on the first message, where the second message is used to indicate that the first terminal and a second terminal belong to a same user equipment cooperative group.

In one embodiment, before sending the preamble sequence to the network device by using the transceiver 803 in the time window, the processor 801 is further configured to receive, by using the transceiver 803, indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, before receiving, by using the transceiver 803, the response message that is sent by the network device based on the preamble sequence, the processor 801 is further configured to: receive, by the transceiver 803, a preamble sequence that is configured by the network device for the second terminal and that is sent by the second terminal. After receiving the preamble sequence sent by the second terminal, the first terminal can learn of the preamble sequence configured by the network device for the second terminal, and a time-frequency resource configured by the network device for the second terminal to send the preamble sequence. Therefore, an index of the preamble sequence configured by the network device for the second terminal and/or information about the time-frequency resource configured by the network device for the second terminal to send the preamble sequence may be subsequently included in the first message, to identify the second terminal.

In one embodiment, the first message further includes an index of a preamble sequence configured by the network device for the second terminal, and the preamble sequence configured by the network device for the second terminal is used to identify the second terminal.

In one embodiment, the first message further includes information about a time-frequency resource configured by the network device for the second terminal to send a preamble sequence, and the time-frequency resource configured by the network device for the second terminal to send the preamble sequence is used to identify the second terminal.

In one embodiment, the first message further includes an index of a preamble sequence configured by the network device for the second terminal and information about a time-frequency resource configured by the network device for the second terminal to send the preamble sequence, and the preamble sequence configured by the network device for the second terminal and the time-frequency resource configured by the network device for the second terminal to send the preamble sequence are used to jointly identify the second terminal.

It should be noted that alternatively, for implementation of each operation, refer to the corresponding description of the method embodiment shown in FIG. 2.

In the terminal 80 described in FIG. 8, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

Figure 9:
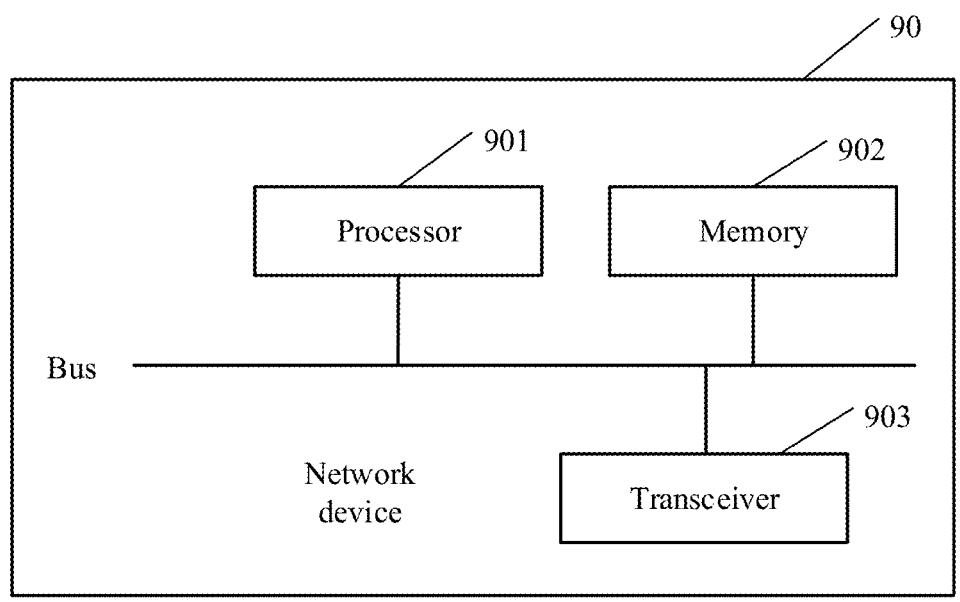
FIG. 9 is a schematic structural diagram of another network device according to an embodiment.

FIG. 9 shows a network device 90 according to an embodiment. The network device 90 includes a processor 901, a memory 902, and a transceiver 903. The processor 901, the memory 902, and the transceiver 903 are connected to each other by using a bus.

The memory 902 includes, but is not limited to, a RAM, a ROM, an EPROM, or a CD-ROM. The memory 902 is configured to store a related instruction and related data. The transceiver 903 is configured to receive and send data.

The processor 901 may be one or more CPUs. When the processor 901 is one CPU, the CPU may be a single-core CPU or a multi-core CPU.

The processor 901 in the network device 90 is configured to read program code stored in the memory 902, to perform the following operations:

first, receiving, by using the transceiver 903, a preamble sequence sent by a first terminal;

then, sending a response message to the first terminal by using the transceiver 903 based on the preamble sequence;

subsequently, receiving, by using the transceiver 903, a first message sent by the first terminal, where the first message includes information used to identify the first terminal; and the first message further includes an index of a preamble sequence configured by the network device for a second terminal and/or information about a time-frequency resource configured by the network device for the second terminal to send the preamble sequence configured for the first terminal; and finally, sending a second message to the second terminal and the first terminal by using the transceiver 903, where the second message is used to indicate that the first terminal and the second terminal belong to a same user equipment cooperative group.

In one embodiment, the processor 901 receives, by using the transceiver 903, the preamble sequence sent by the first terminal by: receiving, by using the transceiver 903, the preamble sequence that is sent by the first terminal in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the processor 901 receives, by using the transceiver 903, the preamble sequence that is sent by the first terminal in the time window, the processor 901 is further configured to send indication information to the first terminal by using the transceiver 903, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

It should be noted that alternatively, for implementation of each operation, refer to the corresponding description of the method embodiment shown in FIG. 2.

In the network device 90 described in FIG. 9, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

Figure 10:
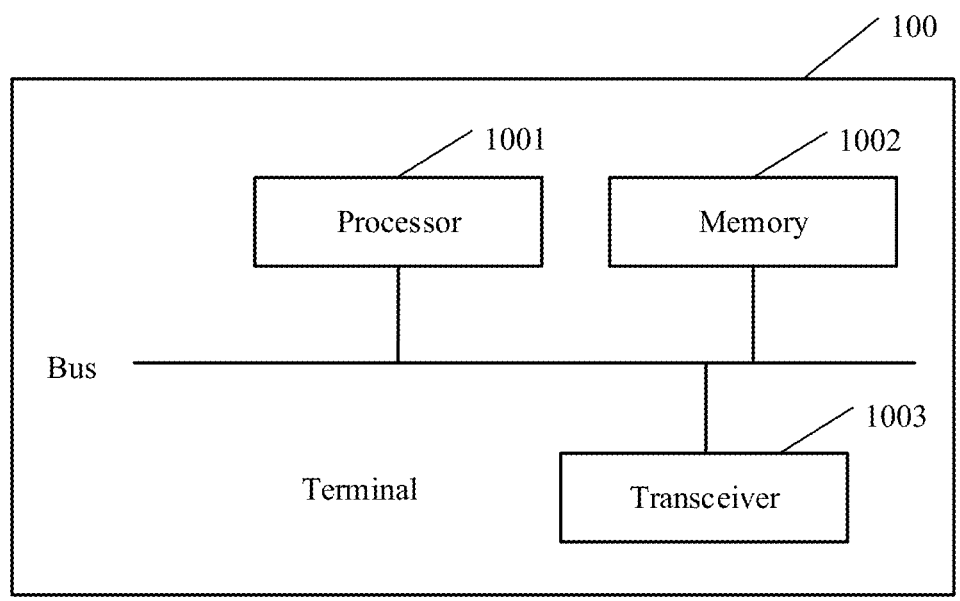
FIG. 10 is a schematic structural diagram of another terminal according to an embodiment.

FIG. 10 shows a terminal 100 according to an embodiment. The terminal is also referred to as a first terminal. The terminal 100 includes a processor 1001, a memory 1002, and a transceiver 1003. The processor 1001, the memory 1002, and the transceiver 1003 are connected to each other by using a bus.

The memory 1002 includes, but is not limited to, a RAM, a ROM, an EPROM, or a CD-ROM. The memory 1002 is configured to store a related instruction and related data. The transceiver 1003 is configured to receive and send data.

The processor 1001 may be one or more CPUs. When the processor 1001 is one CPU, the CPU may be a single-core CPU or a multi-core CPU.

The processor 1001 in the terminal 100 is configured to read program code stored in the memory 1002, to perform the following operations:

first, sending a preamble sequence to a network device by using the transceiver 1003;

then, receiving, by using the transceiver 1003, a response message that is sent by the network device based on the preamble sequence;

subsequently, sending a first message to the network device by using the transceiver 1003 based on the response message, where the first message includes information used to identify the first terminal; and the first message further includes an index of a preamble sequence configured by the network device for the second terminal and/or information about a time-frequency resource configured by the network device for the second terminal to send the preamble sequence configured for the first terminal; and finally, receiving, by using the transceiver 1003, a second message that is sent by the network device based on the first message, where the second message is used to indicate that the first terminal and the second terminal belong to a same user equipment cooperative group.

In one embodiment, the processor 1001 sends the preamble sequence to the network device by using the transceiver 1003 by: sending the preamble sequence to the network device by using the transceiver 1003 in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, before the processor 1001 sends the preamble sequence to the network device by using the transceiver 1003 in the time window, the processor 1001 is further configured to receive, by using the transceiver 1003, indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

It should be noted that alternatively, for implementation of each operation, refer to the corresponding description of the method embodiment shown in FIG. 2.

In the terminal 100 described in FIG. 10, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

Figure 11:
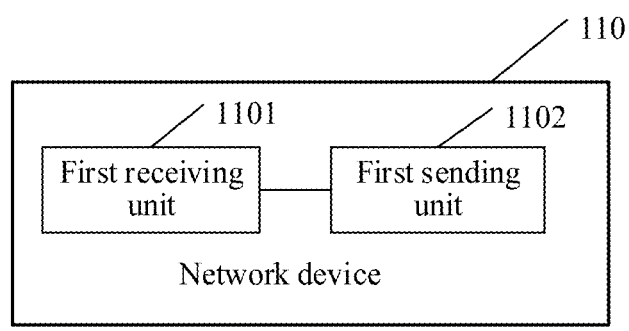
FIG. 11 is a schematic structural diagram of another network device according to an embodiment.

FIG. 11 is a schematic structural diagram of a network device 110 according to an embodiment. The network device 110 may include a first receiving unit 1101 and a first sending unit 1102. Detailed descriptions of the units are as follows:

The first receiving unit 1101 is configured to receive a preamble sequence that is sent by a first terminal in a time window.

The first sending unit 1102 is configured to send a response message to the first terminal based on the preamble sequence.

The first receiving unit 1101 is configured to receive a first message sent by the first terminal, where the first message includes information used to identify the first terminal.

The first sending unit 1102 is configured to send a second message to a second terminal and the first terminal, where the second message is used to indicate that the first terminal and the second terminal belong to a same user equipment cooperative group.

In one embodiment, the first sending unit is further configured to: before the first receiving unit receives the preamble sequence that is sent by the first terminal in the time window, send indication information to the first terminal, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, the first message further includes an index of a preamble sequence configured by the network device for the second terminal, and the preamble sequence configured by the network device for the second terminal is used to identify the second terminal.

In one embodiment, the first message further includes information about a time-frequency resource configured by the network device for the second terminal to send a preamble sequence, and the time-frequency resource configured by the network device for the second terminal to send the preamble sequence is used to identify the second terminal.

In one embodiment, the first message further includes an index of a preamble sequence configured by the network device for the second terminal and information about a time-frequency resource configured by the network device for the second terminal to send the preamble sequence, and the preamble sequence configured by the network device for the second terminal and the time-frequency resource configured by the network device for the second terminal to send the preamble sequence are used to jointly identify the second terminal.

It should be noted that alternatively, for implementation of each unit, refer to the corresponding description of the method embodiment shown in FIG. 2.

In the network device 110 described in FIG. 11, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

Figure 12:
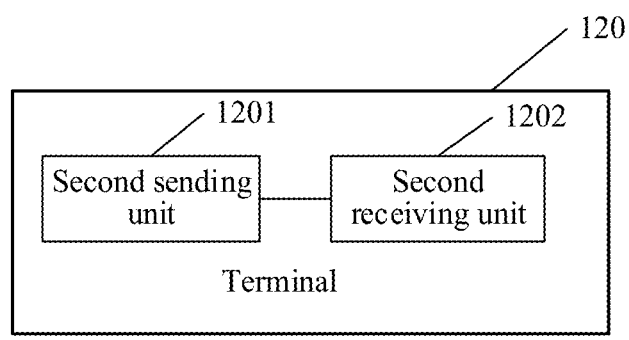
FIG. 12 is a schematic structural diagram of another terminal according to an embodiment.

FIG. 12 is a schematic structural diagram of a terminal 120 according to an embodiment. The terminal 120 may also be referred to as a first terminal subsequently. The terminal 120 includes a second sending unit 1201 and a second receiving unit 1202. Detailed descriptions of the units are as follows:

The second sending unit 1201 is configured to send a preamble sequence to a network device in a time window.

The second receiving unit 1202 is configured to receive a response message that is sent by the network device based on the preamble sequence.

The second sending unit 1201 is configured to send a first message to the network device based on the response message, where the first message includes information used to identify the first terminal.

The second receiving unit 1202 is configured to receive a second message that is sent by the network device based on the first message, where the second message is used to indicate that the first terminal and a second terminal belong to a same user equipment cooperative group.

In one embodiment, the second receiving unit is configured to: before the second sending unit sends the preamble sequence to the network device in the time window, receive indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

In one embodiment, the second receiving unit is configured to: before the second receiving unit receives the response message that is sent by the network device based on the preamble sequence, receive a preamble sequence that is configured by the network device for the second terminal and that is sent by the second terminal. After receiving the preamble sequence sent by the second terminal, the first terminal can learn of the preamble sequence configured by the network device for the second terminal, and a time-frequency resource configured by the network device for the second terminal to send the preamble sequence. Therefore, an index of the preamble sequence configured by the network device for the second terminal and/or information about the time-frequency resource configured by the network device for the second terminal to send the preamble sequence may be subsequently included in the first message, to identify the second terminal.

In one embodiment, the first message further includes an index of a preamble sequence configured by the network device for the second terminal, and the preamble sequence configured by the network device for the second terminal is used to identify the second terminal.

In one embodiment, the first message further includes information about a time-frequency resource configured by the network device for the second terminal to send a preamble sequence, and the time-frequency resource configured by the network device for the second terminal to send the preamble sequence is used to identify the second terminal.

In one embodiment, the first message further includes an index of a preamble sequence configured by the network device for the second terminal and information about a time-frequency resource configured by the network device for the second terminal to send the preamble sequence, and the preamble sequence configured by the network device for the second terminal and the time-frequency resource configured by the network device for the second terminal to send the preamble sequence are used to jointly identify the second terminal.

It should be noted that alternatively, for implementation of each unit, refer to the corresponding description of the method embodiment shown in FIG. 2.

In the terminal 120 described in FIG. 12, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

Figure 13:
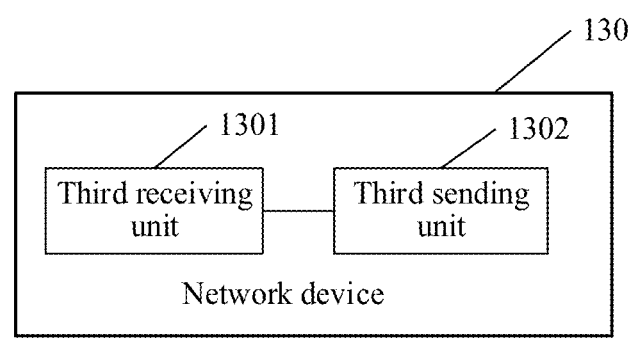
FIG. 13 is a schematic structural diagram of another network device according to an embodiment.

FIG. 13 is a schematic structural diagram of a network device 130 according to an embodiment. The network device 130 may include a third receiving unit 1301 and a third sending unit 1302. Detailed descriptions of the units are as follows:

The third receiving unit 1301 is configured to receive a preamble sequence sent by a first terminal.

The third sending unit 1302 is configured to send a response message to the first terminal based on the preamble sequence.

The third receiving unit 1301 is configured to receive a first message sent by the first terminal, where the first message includes information used to identify the first terminal, and the first message further includes an index of a preamble sequence configured by the network device for a second terminal and/or information about a time-frequency resource configured by the network device for the second terminal to send the preamble sequence configured for the first terminal.

The third sending unit 1302 is configured to send a second message to the second terminal and the first terminal, where the second message is used to indicate that the first terminal and the second terminal belong to a same user equipment cooperative group.

In one embodiment, that the third receiving unit 1301 is configured to receive the preamble sequence sent by the first terminal is: the third receiving unit 1301 is configured to receive the preamble sequence that is sent by the first terminal in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, the third sending unit is further configured to: before the third receiving unit receives the preamble sequence that is sent by the first terminal in the time window, send indication information to the first terminal, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

It should be noted that alternatively, for implementation of each unit, refer to the corresponding description of the method embodiment shown in FIG. 2.

In the network device 130 described in FIG. 13, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

Figure 14:
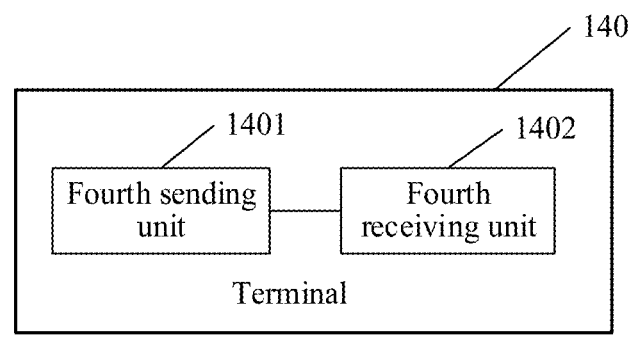
FIG. 14 is a schematic structural diagram of another terminal according to an embodiment.

FIG. 14 is a schematic structural diagram of a terminal 140 according to an embodiment. The terminal 140 is also referred to as a first terminal subsequently. The terminal 140 includes a fourth sending unit 1401 and a fourth receiving unit 1402. Detailed descriptions of the units are as follows:

The fourth sending unit 1401 is configured to send a preamble sequence to a network device.

The fourth receiving unit 1402 is configured to receive a response message that is sent by the network device based on the preamble sequence.

The fourth sending unit 1401 is configured to send a first message to the network device based on the response message, where the first message includes information used to identify the first terminal, and the first message further includes an index of a preamble sequence configured by the network device for a second terminal and/or information about a time-frequency resource configured by the network device for the second terminal to send the preamble sequence configured for the first terminal.

The fourth receiving unit 1402 is configured to receive a second message that is sent by the network device based on the first message, where the second message is used to indicate that the first terminal and the second terminal belong to a same user equipment cooperative group.

In one embodiment, that the fourth sending unit 1401 is configured to send the preamble sequence to the network device is: the fourth sending unit is configured to send the preamble sequence to the network device in a time window. That is, if the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

In one embodiment, the fourth receiving unit is configured to: before the fourth sending unit sends the preamble sequence to the network device in the time window, receive indication information sent by the network device, where the indication information is used to indicate the time window. In this case, the first terminal can send the preamble sequence to the network device in the time window. Certainly, the time window may alternatively be predefined in the first terminal. The time window has a time domain start location, a time domain end location, and a time domain length, and the time domain length is equal to a time difference between the time domain end location and the time domain start location. The time window may be configured (or defined) by configuring (or defining) at least two of the time domain start location, the time domain end location, and the time domain length.

It should be noted that alternatively, for implementation of each unit, refer to the corresponding description of the method embodiment shown in FIG. 2.

In the terminal 140 described in FIG. 14, by running the units described above, the network device configures the preamble sequence for the first terminal and configures the time-frequency resource for the second terminal, where the time-frequency resource is used by the second terminal to send the preamble sequence, and then the second terminal sends the preamble sequence to the first terminal by using the time-frequency resource. The first message subsequently sent by the first terminal to the network device includes the index of the preamble sequence and/or the information about the time-frequency resource, to identify the second terminal. In this way, the network device learns that the network device needs to establish a cooperative relationship between the first terminal and the second terminal, rather than a cooperative relationship between the first terminal and another device.

In conclusion, by implementing the embodiments of this application, the first terminal sends a preamble sequence to the network device in a preset time window, and then the network device performs several rounds of information exchange with the first terminal, to determine that the first terminal can be used as a cooperating terminal of the second terminal, thereby establishing a user equipment cooperative group including the first terminal and the second terminal. If the first terminal obtains an available PRACH in the time window after waiting, the first terminal sends the preamble sequence to the network device through the available PRACH. If the first terminal does not obtain an available PRACH in the time window after waiting, the first terminal no longer sends the preamble sequence to the network device. This greatly reduces a delay caused because the first terminal waits for an available PRACH in a process of establishing the user equipment cooperative group, and significantly improves efficiency of establishing the user equipment cooperative group.

Persons of ordinary skill in the art may understand that all or some of the procedures of the methods in the embodiments may be implemented by a computer program instructing relevant hardware. The program may be stored in a computer-readable storage medium. When the program runs, the procedures of the methods in the embodiments are performed. The foregoing storage medium includes: any medium that can store program code, such as a ROM, a RAM, a magnetic disk, or an optical disc.

What is claimed is:

1. A communication method, comprising:
   receiving, by a network device, a first preamble sequence that is sent by a first terminal in a time window;
   sending, by the network device, a response message to the first terminal based on the first preamble sequence;
   receiving, by the network device, a first message sent by the first terminal, wherein the first message comprises information used to identify the first terminal; and
   sending, by the network device, a second message to a second terminal and the first terminal, wherein the second message is used to indicate that the first terminal and the second terminal belong to a same user equipment cooperative group;
   wherein the first message further comprises
      information about a time-frequency resource configured by the network device for the second terminal to send a second preamble sequence, and the time-frequency resource configured by the network device for the second terminal to send the second preamble sequence is used to identify the second terminal, or
      an index of a second preamble sequence configured by the network device for the second terminal and information about a time-frequency resource configured by the network device for the second terminal to send the second preamble sequence, and the second preamble sequence configured by the network device for the second terminal and the time-frequency resource configured by the network device for the second terminal to send the second preamble sequence are used to jointly identify the second terminal.

2. The method according to claim 1, further comprising: before receiving the first preamble sequence that is sent by the first terminal in the time window,
   sending, by the network device, indication information to the first terminal, wherein the indication information is used to indicate the time window.

3. A communication method, comprising:
   sending, by a first terminal, a first preamble sequence to a network device in a time window;
   receiving, by the first terminal, a response message that is sent by the network device based on the first preamble sequence;
   sending, by the first terminal, a first message to the network device based on the response message, wherein the first message comprises information used to identify the first terminal; and
   receiving, by the first terminal, a second message that is sent by the network device based on the first message, wherein the second message is used to indicate that the first terminal and a second terminal belong to a same user equipment cooperative group;
   wherein the first message further comprises
      information about a time-frequency resource configured by the network device for the second terminal to send a second preamble sequence, and the time-frequency resource configured by the network device for the second terminal to send the second preamble sequence is used to identify the second terminal, or
      an index of a second preamble sequence configured by the network device for the second terminal and information about a time-frequency resource configured by the network device for the second terminal to send the second preamble sequence, and the second preamble sequence configured by the network device for the second terminal and the time-frequency resource configured by the network device for the second terminal to send the second preamble sequence are used to jointly identify the second terminal.

4. The method according to claim 3, further comprising: before sending the first preamble sequence to the network device in the time window,
   receiving, by the first terminal, indication information sent by the network device, wherein the indication information is used to indicate the time window.

5. The method according to claim 3, further comprising: before the receiving the response message that is sent by the network device based on the first preamble sequence,
   receiving, by the first terminal, the second preamble sequence that is configured by the network device for the second terminal and that is sent by the second terminal.

6. A network device comprising a processor, a memory, and a transceiver, the memory being configured to store instructions, and the processor being configured to invoke the instructions in the memory to perform operations, the operations comprising:
   receiving, by using the transceiver, a first preamble sequence that is sent by a first terminal in a time window;
   sending a response message to the first terminal by using the transceiver based on the first preamble sequence;
   receiving, by using the transceiver, a first message sent by the first terminal, wherein the first message comprises information used to identify the first terminal; and
   sending a second message to a second terminal and the first terminal by using the transceiver, wherein the second message is used to indicate that the first terminal and the second terminal belong to a same user equipment cooperative group;
   wherein the first message further comprises
      information about a time-frequency resource configured by the network device for the second terminal to send a second preamble sequence, and the time-frequency resource configured by the network device for the second terminal to send the second preamble sequence is used to identify the second terminal, or
      an index of a second preamble sequence configured by the network device for the second terminal and information about a time-frequency resource configured by the network device for the second terminal to send the second preamble sequence, and the second preamble sequence configured by the network device for the second terminal and the time-frequency resource configured by the network device for the second terminal to send the second preamble sequence are used to jointly identify the second terminal.

7. The network device according to claim 6, wherein the operations further comprise: before receiving the first preamble sequence that is sent by the first terminal in the time window, sending indication information to the first terminal by using the transceiver, wherein the indication information is used to indicate the time window.

8. A first terminal comprising a processor, a memory, and a transceiver, the memory being configured to store instructions, and the processor is configured to invoke the instructions in the memory to perform operations, the operations comprising:

sending a first preamble sequence to a network device by using the transceiver in a time window;

receiving, by using the transceiver, a response message that is sent by the network device based on the first preamble sequence;

sending a first message to the network device by using the transceiver based on the response message, wherein the first message comprises information used to identify the first terminal; and receiving, by using the transceiver, a second message that is sent by the network device based on the first message, wherein the second message is used to indicate that the first terminal and a second terminal belong to a same user equipment cooperative group;

wherein the first message further comprises an index of a second preamble sequence configured by the network device for the second terminal, and the second preamble sequence configured by the network device for the second terminal is used to identify the second terminal, or information about a time-frequency resource configured by the network device for the second terminal to send a second preamble sequence, and the time-frequency resource configured by the network device for the second terminal to send the second preamble sequence is used to identify the second terminal.

9. The first terminal according to claim 8, wherein the operations further comprise: before sending the first preamble sequence to the network device by using the transceiver in the time window, receiving, by using the transceiver, indication information sent by the network device, wherein the indication information is used to indicate the time window.

* * * * *